(12) United States Patent
Liu et al.

(10) Patent No.: US 12,497,672 B2
(45) Date of Patent: Dec. 16, 2025

(54) METHOD FOR PREPARING NANO-PHASE REINFORCED NICKEL-BASED HIGH-TEMPERATURE ALLOY USING MICRON CERAMIC PARTICLES

(71) Applicant: CENTRAL SOUTH UNIVERSITY, Changsha (CN)

(72) Inventors: Zuming Liu, Changsha (CN); Bing Wei, Changsha (CN); Bizhong Nong, Changsha (CN); Xueqian Lv, Changsha (CN); Yake Ren, Changsha (CN); Bin Cao, Changsha (CN); Yongkang Ai, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 521 days.

(21) Appl. No.: 18/023,731

(22) PCT Filed: Aug. 31, 2020

(86) PCT No.: PCT/CN2020/112696
§ 371 (c)(1),
(2) Date: Jul. 5, 2023

(87) PCT Pub. No.: WO2022/041255
PCT Pub. Date: Mar. 3, 2022

(65) Prior Publication Data
US 2024/0060156 A1 Feb. 22, 2024

(30) Foreign Application Priority Data
Aug. 30, 2020 (CN) .......................... 202010891080.X

(51) Int. Cl.
*C22C 1/059* (2023.01)
*B22F 9/04* (2006.01)
(Continued)

(52) U.S. Cl.
CPC ................ *C22C 1/059* (2023.01); *B22F 9/04* (2013.01); *B22F 10/28* (2021.01); *B22F 10/85* (2021.01);
(Continued)

(58) Field of Classification Search
CPC ..... C22C 1/059; C22C 1/0433; C22C 1/1084; C22C 19/03; B33Y 10/00; B33Y 50/02;
(Continued)

(56) References Cited

FOREIGN PATENT DOCUMENTS

| CN | 101649398 B | 10/2010 |
|----|-------------|---------|
| CN | 102876926 A | 1/2013  |

(Continued)

*Primary Examiner* — Ricardo D Morales
(74) *Attorney, Agent, or Firm* — Bayramoglu Law Offices

(57) ABSTRACT

A method for preparing a nano-phase strengthened nickel-based superalloy using micron-scale ceramic particles is provided. In the method, a nickel-based superalloy is used as a matrix, and one or more of TiC, $TiB_2$, WC and $Al_2O_3$ are used as a strengthening phase. A ceramic particle raw material used as the strengthening phase has a particle size of 1-5 μm and is added in an amount of 1-5 wt. %. A nickel-based superalloy composite powder having homogeneously distributed nano-scale ceramic is prepared by mechanical milling. A nano-scale ceramic phase strengthened nickel-based superalloy is prepared by 3D printing technology, which has a homogeneously distributed nano-scale ceramic phase and excellent mechanical properties.

10 Claims, 3 Drawing Sheets

(51) Int. Cl.
  *B22F 10/28* (2021.01)
  *B22F 10/85* (2021.01)
  *B33Y 10/00* (2015.01)
  *B33Y 40/10* (2020.01)
  *B33Y 50/02* (2015.01)
  *C22C 1/04* (2023.01)
  *C22C 1/10* (2023.01)
  *C22C 19/03* (2006.01)

(52) U.S. Cl.
  CPC .............. *B33Y 10/00* (2014.12); *B33Y 40/10* (2020.01); *B33Y 50/02* (2014.12); *C22C 1/0433* (2013.01); *C22C 1/1084* (2013.01); *C22C 19/03* (2013.01); *B22F 2009/043* (2013.01); *B22F 2201/10* (2013.01); *B22F 2301/00* (2013.01); *B22F 2302/10* (2013.01); *B22F 2304/10* (2013.01); *B22F 2998/10* (2013.01); *B22F 2999/00* (2013.01)

(58) Field of Classification Search
  CPC .......... B33Y 40/10; B22F 10/85; B22F 10/28; B22F 9/04; B22F 2009/043; B22F 2201/10; B22F 2301/00; B22F 2302/10; B22F 2304/10; B22F 2998/10; B22F 2999/00
  See application file for complete search history.

(56) References Cited

FOREIGN PATENT DOCUMENTS

| | | | |
|---|---|---|---|
| CN | 104745887 A | | 7/2015 |
| CN | 107116217 A | | 9/2017 |
| CN | 108728695 A | * 11/2018 | ............ B22F 10/366 |
| CN | 109439962 A | | 3/2019 |
| CN | 109759598 A | | 5/2019 |
| JP | H01316436 A | | 12/1989 |
| JP | 2004176136 A | | 6/2004 |

* cited by examiner

METHOD FOR PREPARING NANO-PHASE REINFORCED NICKEL-BASED HIGH-TEMPERATURE ALLOY USING MICRON CERAMIC PARTICLES

CROSS REFERENCE TO RELATED APPLICATIONS

This application is the national stage entry of International Application No. PCT/CN2020/112696 filed Aug. 31, 2020, and which is based upon and claims priority to Chinese Patent Application No. 202010891080.X filed Aug. 30, 2020, the entire contents of which are incorporated by reference herein.

TECHNICAL FIELD

The present disclosure provides a method for preparing a nano-phase strengthened nickel-based superalloy using micron-scale ceramic particles, relating to the field of nickel-based alloy preparation.

BACKGROUND

Nickel-based superalloys have high tensile strength and creep strength at high temperature, good fatigue performance and fracture toughness, good oxidation resistance and corrosion resistance, etc., and have good microstructure stability and service perform reliability at high temperature, and are widely used to manufacture hot-section components of aircraft jet engines and various industrial gas turbines. The development of aero-engines with high thrust-to-weight ratio poses higher requirements for the comprehensive performance (strength, service temperature, durability, etc.) of nickel-based superalloys.

Ceramic particle-strengthened metal-based composite materials have the advantages of high specific strength, high specific modulus, high temperature resistance, low coefficient of thermal expansion, high wear resistance, high corrosion resistance and good dimensional stability. Nanoparticle-strengthened nickel-based superalloy composite materials have improved mechanical properties such as strength and hardness while maintaining good toughness, high creep strength at high temperature and good fatigue strength. However, the main difficulties in the preparation of nano-scale ceramic particle-strengthened nickel-based superalloys are as follows: 1. The nano-scale ceramic particles are very likely to agglomerate due to the huge specific surface energy, and the great difference between the density of ceramic particles and the density of the matrix metal makes is difficult for the homogeneous dispersion of ceramic particles, affecting the strengthening effect of the strengthening phases on the matrix metal. 2. The high melting point of the ceramic material, the poor wettability and the large difference in expansion coefficient between the ceramic material and the matrix material lead to poor interface bonding between the ceramic phase and the matrix. 3. Direct use of nano-scale ceramic particles significantly increases the costs of raw materials.

In view of the above problems, exploratory research has been carried out. Chinese patent (CN101649398B) disclosed a method for synthesizing a TiCx particle-strengthened nickel-based matrix composite material by in-situ reaction. The preparation process includes: (1) preparation of mixed powder, wherein the powder is composed of Ti, C, Al, Fe and Mo, and includes 8-12 wt. % of Al powder, 12-15 wt. % of Fe powder, 3-5 wt. % of Mo powder, 8-12 wt. % of graphite C powder, and the balance of Ti powder, and the weight ratio of the Ti powder to the C powder in the powder needs to be (5-6.7):1; (2) preparation of powder chip: rolling a Ni foil into a cylinder with a diameter of 16-25 mm, and fill the cylinder with the mixed powder obtained by milling and mixing; and (3) melting and casting process: preparing a TiCx/Ni composite material using a vacuum intermediate-frequency induction melting furnace. A TiCx/Ni composite material with a TiCx volume fraction of 20-40% is prepared. The density of the composite material is close to 100%, and the strength and hardness of the composite material at high temperature are significantly higher than those of conventional nickel base superalloys. Chinese patent (CN107116217A) disclosed a method for preparing a TiC-strengthened nickel-based composite material through selective laser melting, including: respectively weighing a nickel-based alloy and a strengthened base alloy according to a ratio, wherein the particle diameter of the added TiC strengthening phase is 5-8 microns; placing the weighed powder in a low-temperature planetary ball milling machine to prepare a nickel-based composite powder, and then placing the prepared nickel-based composite powder on a selective laser melting forming machine to prepare a nickel-based composite material. The yield strength and tensile strength of the prepared alloy material are 599.6-649.6 MPa and 998.5-1079.5 MPa respectively. Chinese patent (CN104745887A) disclosed a nano-scale ceramic particle-strengthened nickel-based superalloy composite material and a laser 3D printing method thereof, wherein a nickel-based superalloy with a particle size of 15-45 μm is used as a matrix, CrC with particle size of 40-100 nm is used as a strengthening phase, and CrC is added in an amount of 2.0-8.0% of the composite material matrix, to prepare a nano-scale CrC particle-strengthened nickel-based superalloy composite material part.

The present disclosure proposes for the first time a method for preparing a nickel-based superalloy composite powder with homogeneous distribution of nanometer ceramic particles using micron-scale ceramic particles as a raw material through a specific milling process, and then preparing a nano-scale ceramic phase-strengthened nickel-based superalloy through 3D printing using the nickel-based superalloy composite powder with homogeneous distribution of nanometer ceramic particles, to realize the homogeneous distribution of the nano-scale ceramic phases in the matrix, thereby solving the problem of agglomeration of the nanometer ceramic phase and the problem of interface defects between the ceramic strengthening phase and the metal matrix due to poor wettability. By using micron-sized ceramic particles, the costs are low, and parts with any complex geometry may be integrally formed by the present disclosure, thereby improving the material utilization rate.

SUMMARY

To solve the problem of easy agglomeration of nano-scale ceramic particles and poor interface bonding with the matrix, the present disclosure provides a method for preparing a nano-phase strengthened nickel-based superalloy using micron-scale ceramic particles, and proposes for the first time a method for preparing a nickel-based superalloy composite powder with homogeneous distribution of nanometer ceramic particles using micron-scale ceramic particles as a raw material through a specific milling process, and then preparing a nano-scale ceramic phase-strengthened nickel-based superalloy through 3D printing using the nickel-based superalloy composite powder with homogeneous distribution of nanometer ceramic particles, to realize the homogeneous distribution of the nano-scale ceramic phases in the matrix. In the process of 3D printing, Marangoni convection is used to stir the melt, to promote the rearrangement of ceramic particles in the melt, thereby solving the problem of agglomeration of the nano-scale ceramic phase and realizing the homogeneous distribution of the nano-scale ceramic phases in the melt. The high temperature melting using a laser or electron beam and rapid solidification solve the problem of the segregation of the nano-scale ceramic phase and the problem of interface defects between the ceramic strengthening phase and the metal matrix due to the poor wettability. By using micron-sized ceramic particles, the costs are low, and parts with any complex geometry may be integrally formed by the present disclosure, thereby improving the material utilization rate.

The present disclosure provides a method for preparing a nano-phase strengthened nickel-based high-temperature alloy using micron-scale ceramic particles, including: using micron-scale ceramic particles as a first raw material A, and using a nickel-based superalloy powder as a second raw material B; wet milling and then dry milling the raw material A and part of the raw material B to obtain a composite powder with homogeneous distribution of nano-scale ceramic particles; mixing the composite powder and the remaining raw material B uniformly to obtain a mixed powder; and 3D printing the mixed powder to obtain an as-built product, wherein a weight ratio of the raw material A to the raw material B is: (1-5):(99-95).

In a method for preparing nano-phase strengthened nickel-based superalloy using micron-scale ceramic particles according to the present disclosure, a particle size of the nickel-based superalloy is 15-53 μm or 53-106 μm; the micron-scale ceramic particles are selected from at least one of TiC, TiB$_2$, WC and Al$_2$O$_3$; a particle size of the micron-scale ceramic particles is 1-5 μm; and the 3D printing is selected from one of selective laser melting (SLM), electron beam melting (EBM) and laser engineered net shaping (LENS).

The method for preparing nano-phase strengthened nickel-based superalloy using micron-scale ceramic particles of the present disclosure includes the following steps:

(1) using the micron-scale ceramic particles as the raw material A, and using the nickel-based superalloy powder as the raw material B, wherein the weight ratio of the raw material A to the raw material B is (1-5):(99-95); taking the raw materials; wet milling and then dry milling the raw material A and part of the raw material B to obtain the composite powder with homogeneous distribution of nano-scale ceramic particles;

(2) putting the composite powder prepared in the step (1) and the remaining raw material B into a V-type mixer for uniform mixing to obtain the mixed powder, wherein an inert atmosphere is used for protection during mixing; and (3) building a 3D CAD model on a computer according to a part shape; slicing and layering the model by using software and then importing it into an additive manufacturing system; and then performing repeated laying, scanning, and melting of the uniformly mixed powder prepared in the step (2) layer by layer according to a determined scanning route through a digital control system by using a focused high-energy laser beam, and solidifying the melt, until a three-dimensional part is built.

In a method for preparing nano-phase strengthened nickel-based superalloy using micron-scale ceramic particles according to the present disclosure, in the step (1), the raw material A, i.e., the micron-scale ceramic particles, and part of the nickel-based superalloy powder B are mixed first, and the weight ratio is 1:1-1:5.

In a method for preparing nano-phase strengthened nickel-based superalloy using micron-scale ceramic particles according to the present disclosure, the wet milling process in the step (1) uses ethanol as a milling medium (wherein the added ethanol needs to close over the powder to prevent oxidation of the raw material powder), and wet milling parameters include: a ball-to-material ratio of 10:1-5:1, a milling rotation speed of 150-300 rpm, and a milling time of 5-20 h; and the dry milling process is conducted in inert gas, and dry milling parameters include: a ball-to-material ratio of 5:1-1:1, a milling rotation speed of 100-200 rpm, and a milling time of 4-10 h.

In a method for preparing nano-phase strengthened nickel-based superalloy using micron-scale ceramic particles according to the present disclosure, before the 3D printing in the step (3), the mixed powder obtained in the step (2) is dried in inert gas at 60-150° C. for 2-12 h.

In a method for preparing nano-phase strengthened nickel-based superalloy using micron-scale ceramic particles according to the present disclosure, a substrate used for the 3D printing in the step (3) is a stainless steel or other nickel-based superalloy.

In a method for preparing nano-phase strengthened nickel-based superalloy using micron-scale ceramic particles according to the present disclosure, laser process parameters in the step (3) include: a laser spot diameter of 70-110 μm, a laser power of 150-300 W, a laser scanning speed of 500-1100 mm/s, a laser scanning spacing of 60-120 μm, and a powder layer thickness of 30-50 μm.

In a method for preparing nano-phase strengthened nickel-based superalloy using micron-scale ceramic particles according to the present disclosure, the inert gas is helium, argon, or a mixture thereof, with a purity of 99.99 wt. % and an oxygen content of less than 0.0001 wt. %.

(1) To solve the problem of easy agglomeration of nano-scale ceramic particles, non-homogeneous distribution of the nano-scale ceramic particles in the matrix, and poor interface bonding with the matrix, the present disclosure provides a method for preparing a nano-phase strengthened nickel-based superalloy using micron-scale ceramic particles, and proposes for the first time a method for preparing a nickel-based superalloy composite powder with homogeneous distribution of nanometer ceramic particles using micron-scale ceramic particles as a raw material through a specific milling process, and then preparing a nano-scale ceramic phase-strengthened nickel-based superalloy through 3D printing using the nickel-based superalloy composite powder with homogeneous distribution of nanometer ceramic particles, to realize the homogeneous distribution of the nano-scale ceramic phases in the matrix. Therefore, the problems of agglomeration, segregation and non-homogeneous distribution of the nano-scale ceramic phase and interface defects between the nano-scale ceramic phase and the metal matrix due to poor wettability are solved. The prepared product has homogeneous distribution of the second phase, fine matrix grains and excellent mechanical properties.

(2) The micron-scale ceramic particles are used as the raw material, mixed with the matrix alloy powder, and milled with a specific milling process, so that the micron-scale ceramic particles are broken into nano-scale ceramic particles, and the nano-scale ceramic particles are homogeneously coated by the matrix alloy powder, thereby effectively solving the problem of agglomeration of the nano-scale ceramic particles. In the process of breaking the micro-scale ceramic particles into nano-scale ceramic particles, the homogeneous distribution of the nano-scale ceramic particles in the matrix alloy powder is realized, and a composite powder with homogeneous distribution of nano-scale ceramic particles is prepared, which provides a basis for the homogeneous distribution of nano-scale ceramic particles in the melt.

(3) In the present disclosure, the micron-scale ceramic particles A and part of the nickel-based superalloy powder B are first wet milled and then dry milled to obtain the composite powder with homogeneous distribution of nano-scale ceramic particles. Through wet milling, the micron-scale ceramic particles can be quickly and homogeneously broken into nano-scale ceramic particles. Through dry milling, the powder is further broken and homogeneously dispersed. The mixing and milling of the ceramic particles A and part of the metal powder B reduces the amount of powder to be milled, thereby improving the efficiency.

(4) By wet milling and dry milling the micro-scale ceramic particles, i.e., the raw material A and the nickel-based superalloy powder B with specific parameters, the micro-scale ceramic particles A can be broken into nano-scale ceramic particles, and the nano-scale ceramic particles are nested with the metal matrix powder B to obtain a nickel-based superalloy composite powder with homogeneous distribution of nano-scale ceramic phases, which provides a basis for the homogeneous distribution of the nano-scale ceramic phases in the melt. Then the composite powder is homogeneously mixed with the remaining nickel-based superalloy powder B to obtain a nickel-based superalloy mixed powder with homogeneous distribution of nano-scale ceramic phases for 3D printing, which ensures the flowability of the mixed powder to the maximum extent and the smooth progress of 3D printing.

(5) Before 3D printing, the powder is wet milled and dry milled to obtain a metal-based composite powder with homogeneous distribution of nano-scale ceramic phases. In the process of 3D printing, Marangoni convection is used to stir the melt, and promote the rearrangement of ceramic particles in the melt, thereby inhibiting the agglomeration of particles and realizing the homogeneous distribution of the nano-scale ceramic phases in the melt. The rapid solidification prevents the gathering of nano-scale ceramics during melt solidification, and a solidified microstructure with homogeneous distribution of nano-scale ceramic phase is obtained, thereby improving the structure uniformity.

(6) The present disclosure solves the problem of the segregation of the nano-scale ceramic phase and the problem of interface defects between the ceramic strengthening phase and the metal matrix due to the poor wettability through the high temperature melting using a laser or electron beam and rapid solidification, and makes the strengthening phase of the prepared composite material maintain nano-scale, thereby finally producing parts with no defects, high density, fine and dense microstructure and excellent mechanical properties.

(7) In the process of 3D printing forming in the present disclosure, the nano-scale ceramic phase is used as the nucleation particles to refine the grains and obtain an equiaxed grain microstructure, thereby effectively inhibiting the cracking of the nickel-based superalloy prepared by 3D printing, and obtaining a high-performance 3D printed product.

(8) In a method for preparing a nano-phase strengthened nickel-based superalloy using micron-scale ceramic particles according to the present disclosure, the 3D printing technology is used to effectively solve the difficulties in the preparation of difficult-to-machine materials and the integral forming of complex geometry parts, does not require the use of forming molds, and shortens the manufacturing cycle and costs.

(9) In a method for preparing a nano-phase strengthened nickel-based superalloy using micron-scale ceramic particles according to the present disclosure, the micro-scale ceramic particles are used as the raw material, and the strengthening phases of the prepared composite material are nano-scale, homogeneously distributed, and well bonded with the matrix, thereby improving the strength and plasticity of the as-built product. The micro-scale ceramic particles adopted by the present disclosure have low costs, a simple method and can be applied on a large scale.

DETAILED DESCRIPTION

The embodiments of the present disclosure will be further described below with reference to the accompanying drawings and specific embodiments.

Example 1

In a method for preparing a nano-phase strengthened nickel-based superalloy using micron-scale ceramic particles according to the present disclosure, a René104 nickel-based superalloy was used as a matrix, and TiC ceramic particles having an average particle size of 1.5 μm were used as strengthening phases, and were added in an amount of 2.0 wt. %.

The matrix raw material is a spherical René104 nickel-based superalloy powder having a particle size of 15-53 μm. The René104 nickel-based superalloy includes the following components: 20.6% of Co, 13% of Cr, 3.4% of Al, 3.9% of Ti, 3.8% of Mo, 2.1% of W, 2.4% of Ta, 0.9% of Nb, 0.05% of Zr, 0.03% of B, and 0.04% of C, the balance being Ni.

The preparation steps of the nano-scale ceramic particle-strengthened nickel-based superalloy composite are as follows:

(1) First, the TiC ceramic particles having an average particle size of 1.5 μm and part of the René104 nickel-based superalloy powder are mixed (at a ratio of 2:3), and then wet milled and dry milled with a high-energy ball milling machine to obtain a composite powder with homogeneous distribution of nano-scale ceramic particles.

(2) The composite powder prepared in the step (1) and the remaining nickel-based superalloy powder are loaded into a V-type mixer for uniform mixing to obtain a mixed powder. An inert atmosphere is used for protection during mixing.

(3) A 3D CAD model is built using a computer according to a part shape. The model is sliced and layered by using software and then is imported into an additive manufacturing system. Repeated laying, scanning, and melting of the uniformly mixed powder prepared in the step (2) are performed layer by layer according to a determined scanning route through a digital control system by using a focused high-energy laser beam, and then the melt is solidified, until a three-dimensional part is built.

The wet milling process in the step (1) uses ethanol as a milling medium, and wet milling parameters include: a ball-to-material ratio of 7.5:1, a milling rotation speed of 250 rpm, and a milling time of 20 h; and the dry milling process is conducted in inert gas, and dry milling parameters include: a ball-to-material ratio of 3:1, a milling rotation speed of 150 rpm, and a milling time of 8 h.

Laser process parameters in the step (3) include: a laser spot diameter of 70 μm, a laser power of 250 W, a laser scanning speed of 900 mm/s, a laser scanning spacing of 90 μm, a powder layer thickness of 40 μm, and a heating temperature of the substrate being 200° C.

The inert gas is argon, with a purity of 99.99 wt. % and an oxygen content of less than 0.0001 wt. %.

Figure 1:
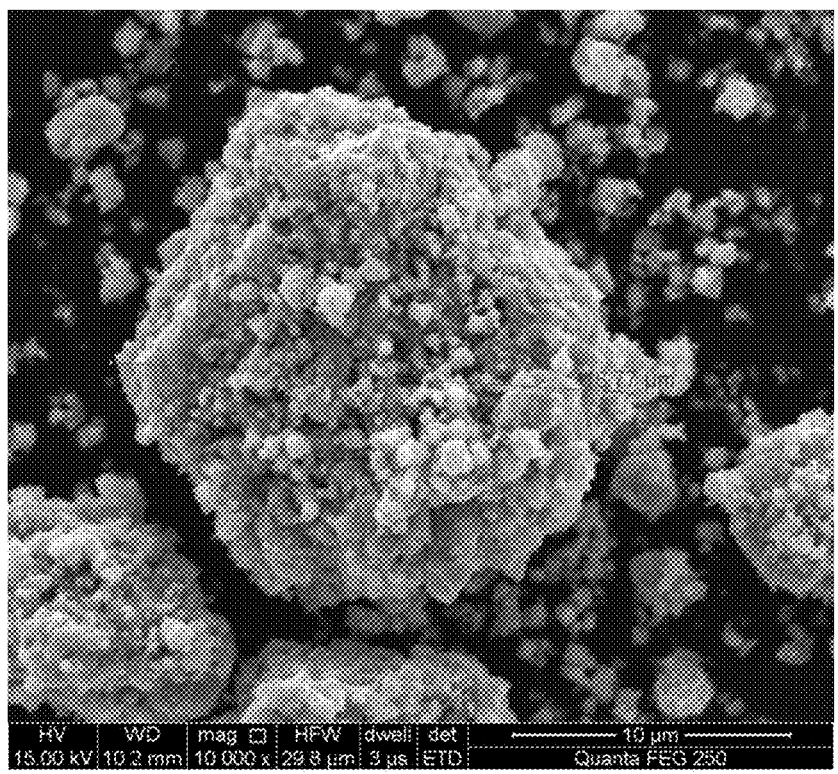
FIG. 1 is a scanning electron microscope (SEM) image of the surface morphology of a nanocomposite powder prepared by wet milling and dry milling of micron-scale ceramic particles and nickel-based superalloy powder in Example 1.

FIG. 1 is an SEM image of the surface morphology of a nanocomposite powder prepared by wet milling and dry milling of micron-scale ceramic particles and nickel-based superalloy powder in Example 1. It can be observed that micron-scale TiC ceramic particles are broken to nanometer scale, to form a composite powder with homogeneous distribution of nano-scale ceramic particles with the matrix René 104 alloy powder.

Figure 2:
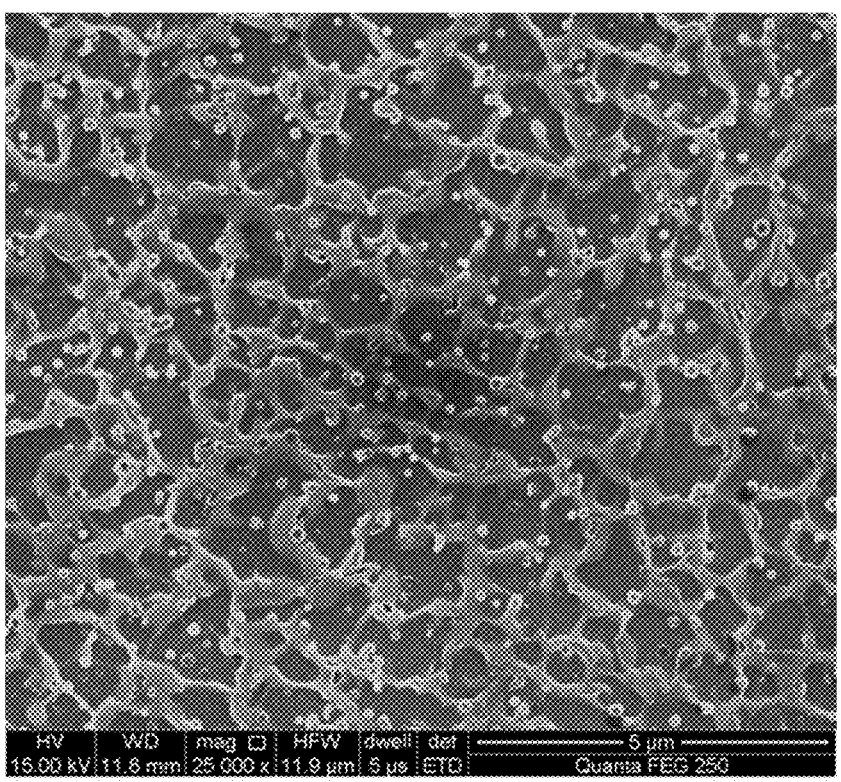
FIG. 2 is an SEM image of the microstructure of the XY plane of a nano-scale TiC ceramic particle-strengthened René104 nickel-based superalloy composite block prepared by laser 3D printing in Example 1.

FIG. 2 is an SEM image of the microstructure of the XY plane of a nano-scale TiC ceramic particle-strengthened nickel-based superalloy composite block prepared by laser 3D printing in Example 1.

Figure 3:
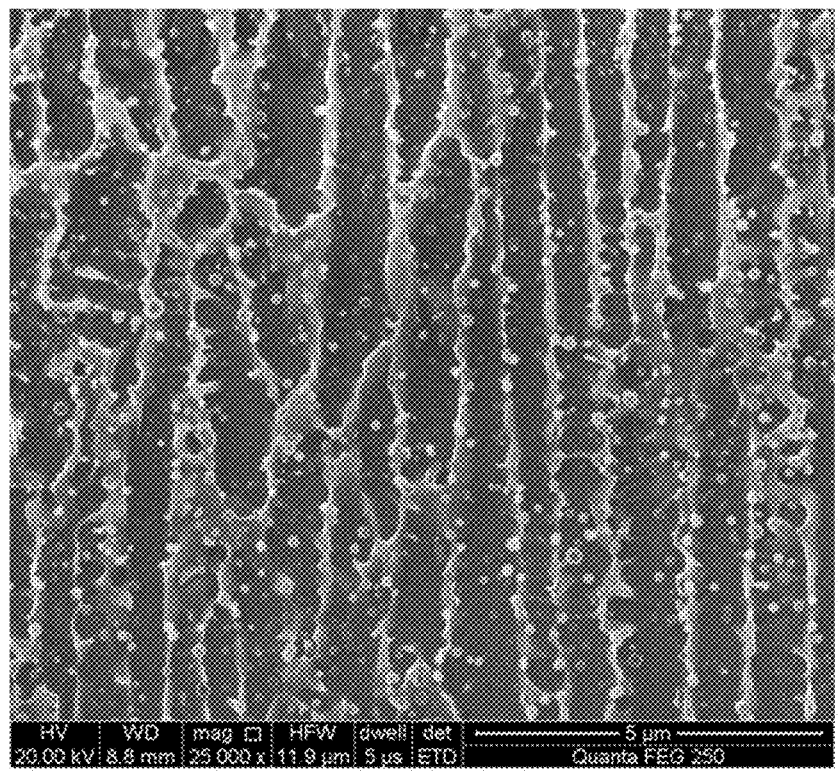
FIG. 3 is an SEM image of the microstructure of the XZ plane of a nano-scale TiC ceramic particle-strengthened René104 nickel-based superalloy composite block prepared by laser 3D printing in Example 1.

FIG. 3 is an SEM image of the microstructure of the XZ plane of a nano-scale TiC ceramic particle-strengthened nickel-based superalloy composite block prepared by laser 3D printing in Example 1.

FIG. 2 and FIG. 3 show that the nano-scale TiC ceramic particles prepared by 3D printing are homogeneously distributed in the matrix, and the prepared composite block has fine, homogeneous grains and a compact structure.

Tests show that the tensile strength of the prepared material sample at room temperature was 1801 MPa; there were 20 microhardness test points, of which the maximum hardness was 613 $HV_{0.2}$, the minimum hardness was 569 $HV_{0.2}$, and the average hardness was 585 $HV_{0.2}$, exhibiting an increase of 62.3% compared with the René104 nickel-based superalloy matrix. Friction and wear performance tests show that the friction coefficient was 0.41 and very stable, and the wear amount was $6.2 \times 10^{-4}$ (mm$^3$/nm) in 30 min.

Example 2

In a method for preparing a nano-phase strengthened nickel-based superalloy using micron-scale ceramic particles according to the present disclosure, a René104 nickel-based superalloy is used as a matrix, and Al$_2$O$_3$ ceramic particles having an average particle size of 2.0 μm are used as strengthening phases, and are added in an amount of 3.0 wt. %.

The matrix raw material is a spherical René104 nickel-based superalloy powder having a particle size of 15-53 μm. The René104 nickel-based superalloy includes the following components: 20.6% of Co, 13% of Cr, 3.4% of Al, 3.9% of Ti, 3.8% of Mo, 2.1% of W, 2.4% of Ta, 0.9% of Nb, 0.05% of Zr, 0.03% of B, and 0.04% of C, the balance being Ni.

The preparation steps of the nano ceramic particle-strengthened nickel-based superalloy composite are as follows:

(1) First, the TiC ceramic particles having an average particle size of 1.5 μm and part of the René104 nickel-based superalloy powder are mixed (at a ratio of 1:2), and then wet milled and dry milled with a high-energy ball milling machine to obtain a composite powder with homogeneous distribution of nano-scale ceramic particles.

(2) The composite powder prepared in the step (1) and the remaining nickel-based superalloy powder are loaded into a V-type mixer for uniform mixing to obtain a mixed powder. An inert atmosphere is used for protection during mixing.

(3) A 3D CAD model is built using a computer according to a part shape. The model is sliced and layered by using software and then is imported into an additive manufacturing system. Repeated laying, scanning, and melting of the uniformly mixed powder prepared in the step (2) are performed layer by layer according to a determined scanning route through a digital control system by using a focused high-energy laser beam, and then the melt is solidified, until a three-dimensional part is built.

The wet milling process in the step (1) uses ethanol as a milling medium, and wet milling parameters include: a ball-to-material ratio of 10:1, a milling rotation speed of 200 rpm, and a milling time of 20 h; and the dry milling process is conducted in inert gas, and dry milling parameters include: a ball-to-material ratio of 5:1, a milling rotation speed of 100 rpm, and a milling time of 10 h.

Laser process parameters in the step (3) include: a laser spot diameter of 70 μm, a laser power of 225 W, a laser scanning speed of 900 mm/s, a laser scanning spacing of 90 μm, a powder layer thickness of 30 μm, and a heating temperature of the substrate being 170° C.

The inert gas is argon, with a purity of 99.99 wt. % and an oxygen content of less than 0.0001 wt. %.

Tests show that the tensile strength of the prepared material sample at room temperature was 1785 MPa; there were 20 microhardness test points, of which the maximum hardness was 621 $HV_{0.2}$, the minimum hardness was 577 $HV_{0.2}$, and the average hardness was 603 $HV_{0.2}$, exhibiting an increase of 68.9% compared with the René104 nickel-based superalloy matrix. Friction and wear performance tests show that the friction coefficient was 0.45 and very stable, and the wear amount was 6.9×10⁻⁴ (mm³/nm) in 30 min.

Example 3

In a method for preparing a nano-phase strengthened nickel-based superalloy using micron-scale ceramic particles according to the present disclosure, a René104 nickel-based superalloy is used as a matrix, and TiC ceramic particles having an average particle size of 1.5 μm and WC ceramic particles having an average particle size of 2.5 μm are used as strengthening phases, and are added in an amount of 1.5 wt. %.

The matrix raw material is a spherical René104 nickel-based superalloy powder having a particle size of 15-53 μm. The René104 nickel-based superalloy includes the following components: 20.6% of Co, 13% of Cr, 3.4% of Al, 3.9% of Ti, 3.8% of Mo, 2.1% of W, 2.4% of Ta, 0.9% of Nb, 0.05% of Zr, 0.03% of B, and 0.04% of C, the balance being Ni.

The preparation steps of the nano-scale ceramic particle-strengthened nickel-based superalloy composite are as follows:
(1) First, the TiC ceramic particles having an average particle size of 1.5 μm and part of the René104 nickel-based superalloy powder are mixed (at a ratio of 1:2), and then wet milled and dry milled with a high-energy ball milling machine to obtain a composite powder with homogeneous distribution of nano-scale ceramic particles.
(2) The composite powder prepared in the step (1) and the remaining nickel-based superalloy powder are loaded into a V-type mixer for uniform mixing to obtain a mixed powder. An inert atmosphere is used for protection during mixing.
(3) A 3D CAD model is built using a computer according to a part shape. The model is sliced and layered by using software and then is imported into an additive manufacturing system. Repeated laying, scanning, and melting of the uniformly mixed powder prepared in the step (2) are performed layer by layer according to a determined scanning route through a digital control system by using a focused high-energy laser beam, and then the melt is solidified, until a three-dimensional part is built.

The wet milling process in the step (1) uses ethanol as a milling medium, and wet milling parameters include: a ball-to-material ratio of 10:1, a milling rotation speed of 225 rpm, and a milling time of 20 h; and the dry milling process is conducted in inert gas, and dry milling parameters include: a ball-to-material ratio of 3:1, a milling rotation speed of 150 rpm, and a milling time of 8 h.

Laser process parameters in the step (3) include: a laser spot diameter of 70 μm, a laser power of 250 W, a laser scanning speed of 900 mm/s, a laser scanning spacing of 90 μm, a powder layer thickness of 45 and a heating temperature of the substrate being 200° C.

The inert gas is argon, with a purity of 99.99 wt. % and an oxygen content of less than 0.0001 wt. %.

Tests show that the tensile strength of the prepared material sample at room temperature was 1782 MPa; there were 20 microhardness test points, of which the maximum hardness was 627 $HV_{0.2}$, the minimum hardness was 588 $HV_{0.2}$, and the average hardness was 611 $HV_{0.2}$, exhibiting an increase of 71.1% compared with the René104 nickel-based superalloy matrix. Friction and wear performance tests show that the friction coefficient was 0.55 and very stable, and the wear amount was 7.4×10⁻⁴ (mm³/nm) in 30 min.

Comparative Example 1

This comparative example is the same as Example 1 except that in the step (1), only wet milling was conducted.

Figure 4:
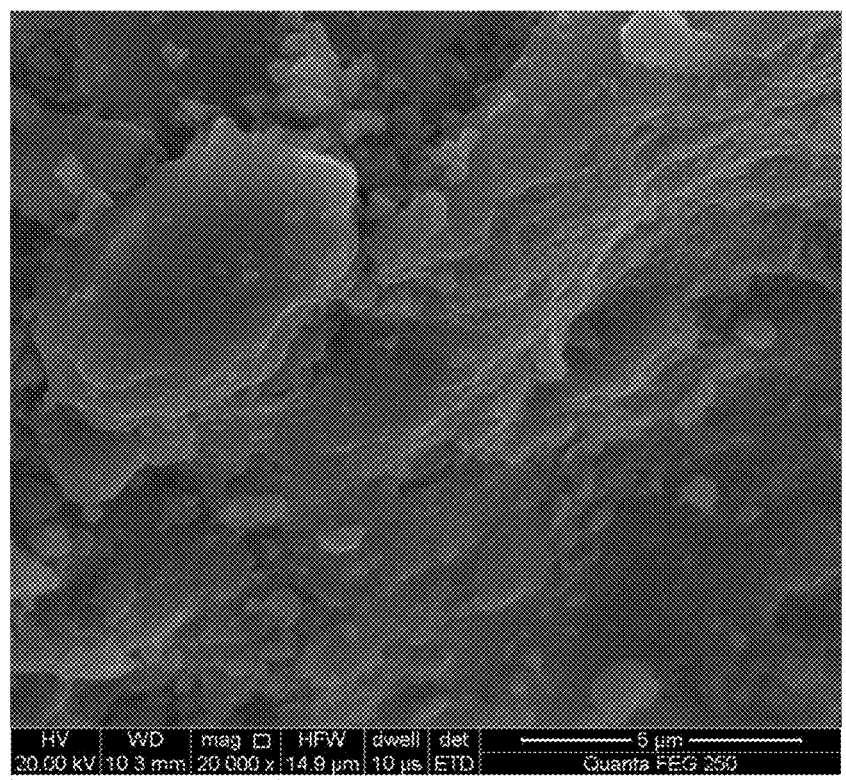
FIG. 4 is an SEM image of the morphology of a powder prepared by only wet milling in Comparative Example 1.

FIG. 4 shows the morphology of a composite powder formed by only wet milling. The composite powder formed by only wet milling is likely to agglomerate, which is not conducive to the subsequent mixing with the nickel-based superalloy, resulting in the non-homogeneous distribution of ceramic particles.

Tests show that the tensile strength of the prepared material sample at room temperature was 1631 MPa; the microhardness at different positions of the prepared composite material differed greatly, and there were 20 microhardness test points, of which the maximum hardness was 615 $HV_{0.2}$, the minimum hardness was 363 $HV_{0.2}$, and the average hardness was 554 $HV_{0.2}$, indicating the non-homogeneous distribution of the ceramic phase. Friction and wear performance tests show that the friction coefficient was 0.61, and the wear amount was 9.5×10⁻⁴ (mm³/nm) in 30 min.

Comparative Example 2

This comparative example is the same as Example 1 except that in the step (1), only dry milling was conducted.

Figure 5:
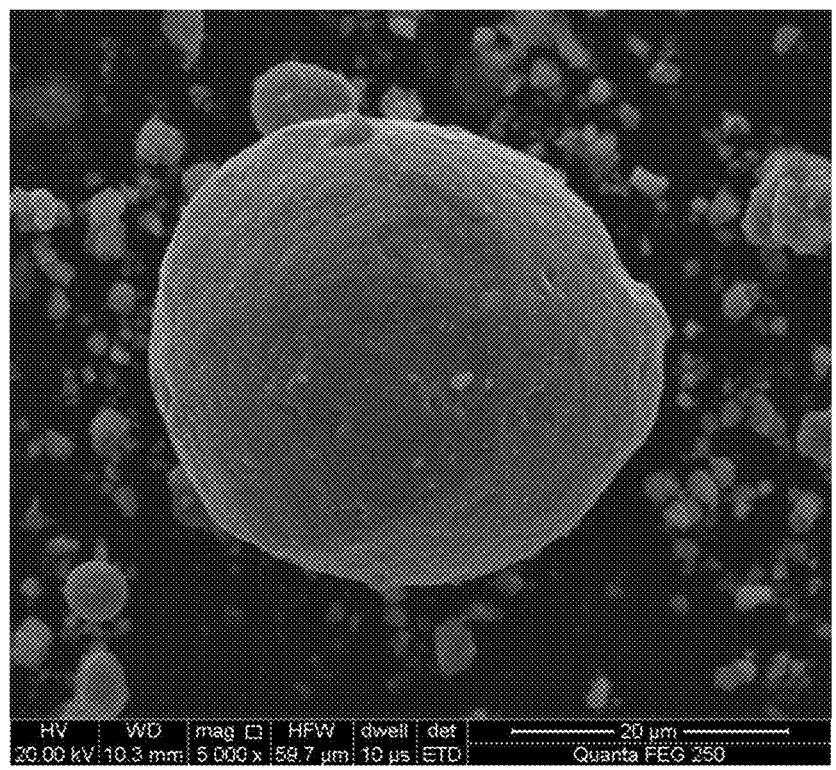
FIG. 5 is an SEM image of the morphology of a powder prepared by only dry milling in Comparative Example 2.

FIG. 5 shows the morphology of a composite powder formed by only dry milling. The ceramic particles cannot be well broken by dry milling alone, and no nanocomposite powder particles were formed.

Tests show that the tensile strength of the prepared material sample at room temperature was 1609 MPa; the microhardness at different positions of the prepared composite material differed greatly, and there were 20 microhardness test points, of which the maximum hardness was 592 $HV_{0.2}$, the minimum hardness was 374 $HV_{0.2}$, and the average hardness was 514 $HV_{0.2}$, indicating the non-homogeneous distribution of the ceramic phase. Friction and wear performance tests show that the friction coefficient was 0.63, and the wear amount was 9.2×10⁻⁴ (mm³/nm) in 30 min.

Comparative Example 3

This comparative example is the same as Example 1 except that in the step (1), dry milling was first conducted followed by wet milling.

When dry milling was first conducted followed by wet milling, the spherical powder was damaged, resulting in poor powder fluidity, which is not conducive to the preparation of high-quality products by 3D printing.

Tests show that the tensile strength of the prepared material sample at room temperature was 1702 MPa; there were 20 microhardness test points, of which the maximum hardness was 589 $HV_{0.2}$, the minimum hardness was 445 $HV_{0.2}$, and the average hardness was 562 $HV_{0.2}$. Friction and wear performance tests show that the friction coefficient was 0.53 and very stable, and the wear amount was 7.6×10⁻⁴ (mm³/nm) in 30 min.

Comparative Example 4

This comparative example is the same as Example 1 except that in the step (1), wet milling was first conducted followed by dry milling, the wet milling process used ethanol as a milling medium, and wet milling parameters included: a ball-to-material ratio of 4:1, a milling rotation speed of 200 rpm, and a milling time of 10 h; and the dry milling process is conducted in inert gas, and dry milling parameters include: a ball-to-material ratio of 10:1, a milling rotation speed of 200 rpm, and a milling time of 5 h.

Tests show that the tensile strength of the prepared material sample at room temperature was 1654 MPa; there were 20 microhardness test points, of which the maximum hardness was 620 $HV_{0.2}$, the minimum hardness was 447 $HV_{0.2}$, and the average hardness was 536 $HV_{0.2}$. Friction and wear performance tests show that the friction coefficient was 0.58 and very stable, and the wear amount was $8.3\times10^{-4}$ ($mm^3$/nm) in 30 min.

Comparative Example 5

A René104 nickel-based superalloy was used as a matrix, and TiC ceramic particles having an average particle size of 5 μm were used as strengthening phases, and were added in an amount of 2.5 wt. %.

The matrix raw material is a spherical René104 nickel-based superalloy powder having a particle size of 15-53 μm. The René104 nickel-based superalloy includes the following components: 20.6% of Co, 13% of Cr, 3.4% of Al, 3.9% of Ti, 3.8% of Mo, 2.1% of W, 2.4% of Ta, 0.9% of Nb, 0.05% of Zr, 0.03% of B, and 0.04% of C, the balance being Ni.

A TiC ceramic phase-strengthened René104 nickel-based superalloy was prepared using the method of Example 1 in Chinese patent (CN107116217A). Milling parameters of the method included: a milling speed of 200 r/s, and a milling time of 8 h.

SLM process parameters included: a laser power of 200 W, a scanning speed of 1000 mm/s, a processing layer thickness of 0.03, and a scanning spacing of 0.04 mm.

In the composite powder prepared by the method of Chinese patent (CN107116217A), the micron-scale TiC ceramic particles were not formed into nano-scale composite powder, the spherical powder became flaky due to the milling treatment, and the powder fluidity was significantly reduced, which is not conducive to the preparation of high-quality products by 3D printing.

Tests show that the tensile strength of the prepared material sample at room temperature was 1591 MPa; there were 20 microhardness test points, of which the maximum hardness was 617 $HV_{0.2}$, the minimum hardness was 383 $HV_{0.2}$, and the average hardness was 475 $HV_{0.2}$. Friction and wear performance tests show that the friction coefficient was 0.68, and the wear amount was $10.2\times10^{-4}$ ($mm^3$/nm) in 30 min.

What is claimed is:

1. A method for preparing a nano-phase strengthened nickel-based superalloy using micron-scale ceramic particles, comprising:
   (1) using micron-scale ceramic particles as a first raw material, and using a nickel-based superalloy powder as a second raw material; wet milling and then dry milling the first raw material and part of the second raw material to obtain a composite powder with homogeneous distribution of nano-scale ceramic particles;
   (2) mixing the composite powder and the remaining second raw material uniformly to obtain a mixed powder; and
   (3) 3D printing the mixed powder to obtain a 3D printed product, wherein a weight ratio of the first raw material to the second raw material is: (1-5):(99-95).

2. The method for preparing a nano-phase strengthened nickel-based superalloy using micron-scale ceramic particles according to claim 1, wherein
   a particle size of the nickel-based superalloy powder is 15-53 μm or 53-106 μm;
   the micron-scale ceramic particles are selected from at least one of TiC, $TiB_2$, WC and $Al_2O_3$; a particle size of the micron-scale ceramic particles is 1-5 μm; and
   the 3D printing is selected from one of selective laser melting (SLM), electron beam melting (EBM) and laser engineered net shaping (LENS).

3. The method for preparing a nano-phase strengthened nickel-based superalloy using micron-scale ceramic particles according to claim 1, wherein the steps further comprise:
   in step (1) the weight ratio of the first raw material to the second raw material is (1-5):(99-95);
   in step (2) putting the composite powder prepared in the step (1) and the remaining second raw material into a V-type mixer for uniform mixing to obtain the mixed powder, wherein an inert atmosphere is used for protection during mixing; and
   in step (3) building a 3D CAD model on a computer according to a part shape; slicing and layering the model using software and then importing it into an additive manufacturing system; then performing repeated laying, scanning, and melting of the uniformly mixed powder prepared in the step (2) layer by layer according to a determined scanning route through a digital control system by using a focused high-energy laser beam, and solidifying the melt, until a 3D part of the 3D printed product is built.

4. The method for preparing a nano-phase strengthened nickel-based superalloy using micron-scale ceramic particles according to claim 3, wherein in step (1), the ceramic particles and part of the nickel-based superalloy powder are mixed first, and the weight ratio is 1:1-1:5.

5. The method for preparing a nano-phase strengthened nickel-based superalloy using micron-scale ceramic particles according to claim 3, wherein the wet milling process in step (1) uses ethanol as a milling medium, and wet milling parameters comprise: a ball-to-material ratio of 10:1-5:1, a milling rotation speed of 150-300 rpm, and a milling time of 5-20 h; and the dry milling process is conducted in inert gas, and dry milling parameters comprise: a ball-to-material ratio of 5:1-1:1, a milling rotation speed of 100-200 rpm, and a milling time of 4-10 h.

6. The method for preparing a nano-phase strengthened nickel-based superalloy using micron-scale ceramic particles according to claim 3, wherein before the 3D printing in step (3), the mixed powder obtained in the step (2) is dried in inert gas at 60-150° C. for 2-12 h.

7. The method for preparing a nano-phase strengthened nickel-based superalloy using micron-scale ceramic particles according to claim 3, wherein the nickel-based superalloy is a René 104 nickel-based superalloy.

8. The method for preparing a nano-phase strengthened nickel-based superalloy using micron-scale ceramic particles according to claim 3, wherein a substrate used for the 3D printing in step (3) is a stainless steel or a nickel-based superalloy.

9. The method for preparing a nano-phase strengthened nickel-based superalloy using micron-scale ceramic particles according to claim 3, wherein laser process parameters in step (3) comprise: a laser spot diameter of 70-110 μm, a laser power of 150-300 W, a laser scanning speed of 500-1100 mm/s, a laser scanning spacing of 60-120 μm, and a powder layer thickness of 30-50 μm.

10. The method for preparing a nano-phase strengthened nickel-based superalloy using micron-scale ceramic particles according to claim 3, wherein the inert gas is helium, argon, or a mixture thereof, with a purity of 99.99 wt. % and an oxygen content of less than 0.0001 wt. %.

* * * * *